(12) United States Patent
Shelor

(10) Patent No.: US 9,161,498 B1
(45) Date of Patent: Oct. 20, 2015

(54) CLIMATE CONTROL SYSTEM AND METHOD FOR A GREENHOUSE

(71) Applicant: GREENHOUSE HVAC LLC, Jacksonville, FL (US)

(72) Inventor: F. Mack Shelor, Palm Coast, FL (US)

( * ) Notice: Subject to any disclaimer, the term of this patent is extended or adjusted under 35 U.S.C. 154(b) by 0 days.

(21) Appl. No.: 14/245,157

(22) Filed: Apr. 4, 2014

(51) Int. Cl.
*A01G 9/18* (2006.01)

(52) U.S. Cl.
CPC .................................. *A01G 9/18* (2013.01)

(58) Field of Classification Search
CPC ............ A01G 9/24; A01G 9/18; A01G 9/245
USPC .............................................................. 47/17
See application file for complete search history.

(56) References Cited

U.S. PATENT DOCUMENTS

| | | | | |
|---|---|---|---|---|
| 3,383,179 | A | * | 5/1968 | Tibbitts ........................ 422/105 |
| 3,999,329 | A | * | 12/1976 | Brais ................................. 47/17 |
| 5,185,139 | A | * | 2/1993 | Krishnamurthy et al. ..... 423/359 |
| 5,713,154 | A | * | 2/1998 | Goldstein et al. ................. 47/17 |
| 5,747,042 | A | * | 5/1998 | Choquet .................... 424/725.1 |
| 8,738,185 | B2 | * | 5/2014 | Puranen et al. ............... 700/276 |
| 2004/0194371 | A1 | * | 10/2004 | Kinnis ............................... 47/17 |
| 2010/0018218 | A1 | * | 1/2010 | Riley et al. ...................... 60/783 |

* cited by examiner

*Primary Examiner* — Rob Swiatek
*Assistant Examiner* — Ebony Evans
(74) *Attorney, Agent, or Firm* — Mark Young, P.A.

(57) ABSTRACT

A greenhouse environment control system generates a $CO_2$-enriched air which is supplied to a greenhouse at a controlled temperature suitable for plant growth. An absorption chiller reduces temperature of a $CO_2$-containing stream of processed gasses from an engine. A mixing and blending unit maintains $CO_2$ at an acceptable concentration for enhanced plant growth and human occupation. An HVAC system modulates temperature and positively pressurizes the greenhouse with the $CO_2$-enriched air to reduce risk of contaminant intrusion. Misting further controls temperature. Retractable shades regulate light supplied to plants and solar gain.

20 Claims, 11 Drawing Sheets

CLIMATE CONTROL SYSTEM AND METHOD FOR A GREENHOUSE

FIELD OF THE INVENTION

This invention relates generally to horticulture, and, more particularly, to a greenhouse with a controlled climate, including temperature, humidity and carbon dioxide concentration.

BACKGROUND

Commercial greenhouses are high tech production facilities for vegetables and flowers. Heretofore, such greenhouses have been adapted for use in regions with cold winters and arid summers. In such climates, the greenhouse interior may be heated in winter months such as by using boilers, heat pumps, or heat transferred from hot engine exhaust. Such greenhouses may be cooled during hot summer months through evaporative cooling systems. One example of such a cooling system is a pad and fan, which draws dry outside air through a wet porous pad to cool the air via evaporative cooling. To work, the fan must continuously draw ambient air through the pad and exhaust the cooled air to the outside. Fogging and misting systems are also widely used to cool greenhouses in arid environments.

In warm humid environments, cooling systems that depend upon evaporation for cooling are marginally effective at best. When considering water evaporating into air, the wet-bulb temperature which takes both temperature and humidity into account is a measure of the potential for evaporative cooling. The amount of heat transfer depends on the evaporation rate, which depends on the temperature and humidity of the air. As humidity increases, the actual air temperature approaches the wet bulb temperature. The less the difference between the wet bulb and actual air temperature, the less the evaporative cooling effect. Thus, in hot humid climates, the evaporative cooling effect is typically insufficient to maintain a greenhouse at a temperature favorable to plant growth.

Photosynthesis depends on a series of external and internal factors. The internal factors are the characteristics of the leaf (structure, chlorophyll content), the accumulation of products assimilated in the chloroplasts of the leaves, the availability of water, mineral nutrients and enzymes, among others. Among the most relevant external factors are the radiation incident on the leaves (quantity and quality), temperature, the ambient humidity and the concentration of $CO_2$ and oxygen in the surrounding air. Excessive heat and humidity, or insufficient $CO_2$, are non-limiting examples of factors that may stifle photosynthesis.

The concentration of $CO_2$ in ambient outside air commonly varies from 300 to 500 parts ppm or more by volume depending on the season, time of day and the proximity of $CO_2$ producers such as combustion or composting, or $CO_2$ absorbers such as plants or bodies of water. Plants growing in greenhouses, particularly sealed structures, can reduce $CO_2$ levels to well below ambient levels, greatly reducing the rate of photosynthesis. Conversely, enriching the concentration of $CO_2$ above ambient levels can significantly increase the rate of photosynthesis. Consequently, many commercial greenhouses include $CO_2$ enrichment systems to augment photosynthesis. Such systems typically supply $CO_2$ from storage vessels or as a product of combustion of carbon-based fuel. The ideal concentration depends on the crop, light intensity, temperature and the stage of crop growth. However, 1000 to 1200 ppm is considered effective for many flowers and vegetables, with some exceptions. At this level, worker exposure should fall far below the 5,000 ppm permissible exposure limit for an 8-hour shift (measured as a time weighted average), as set by the U.S. Occupational Safety & Health Administration (OSHA).

In greenhouses with fan and pad evaporative cooling systems, it is difficult to maintain an elevated $CO_2$ concentration, notwithstanding enrichment efforts. Such greenhouses continuously vent injected $CO_2$ to the atmosphere. A vigorous stream of air must be maintained to provide cooling. The stream captures injected $CO_2$. Venting releases it to the atmosphere with the air stream. This attenuates any benefit to photosynthesis while increasing production costs and compromising the outside environment.

An improved greenhouse climate control system that is capable of controlling temperature, providing heating and cooling as desired, and providing $CO_2$ enrichment for optimal plant growth, in all ambient environments, including hot, cold, arid and humid, is needed. The invention is directed to overcoming one or more of the problems and solving one or more of the needs as set forth above.

SUMMARY OF THE INVENTION

To solve one or more of the problems set forth above, in an exemplary implementation of the invention, a greenhouse system is provided that maintains (1) a positively pressurized $CO_2$-enriched air environment with a $CO_2$ concentration of about 1,200 ppm, (2) an air temperature of between 60 F and 75° F., (3) a relative humidity of between 50% and 70% except under extreme summer conditions, and (4) lighting between about 200 micro mols/square meter/sec and 600 micro mols/square meter/sec during lighted conditions. An exemplary system according to principles of the invention uses urea and selective catalytic reduction (SCR) to reduce pollutants in exhaust gases from combustion of natural gas. Ammonia produced by hydrolysis of urea reacts with nitrogen oxide emissions and is converted into nitrogen and water. An exemplary system according to principles of the invention uses direct heat double effect absorption chillers as a primary heat recovery device to provide both heating and cooling. Direct contact condensing heat exchangers reduce exhaust gas temperature from about a nominal 300° F. to approximately 130° F. in order to more efficiently use the heat in a greenhouse. A mixing and blending unit maintains positive control of entering outside air. Outside air is drawn through a fine particle filter to prevent insects and other airborne foreign matter from entering the mixing and blending unit and greenhouse. Using a fan and optional damper, the mixing and blending unit controls the intake of outside air to constantly maintain both the oxygen and $CO_2$ level within an acceptable range of setpoint values.

Ductwork leads from an outlet of the mixing and blending unit to fan and coil units. The fan and coil units have outlets within the greenhouse. The fan and coil units maintain a positive pressure in the greenhouse which will continually expel air from the greenhouse out of one or more vents, such as a screened roof vent, and return ductwork, allowing for additional cooled and dehumidified air to enter the greenhouse through the fan and coil units. Concomitantly, the fan and coil units provide a negative pressure to the mixing and blending Unit to assist in drawing in the outside air, without imposing a back pressure on the generator that is providing $CO_2$.

During warm days chilled water (i.e., water at about 40 to 50° F., preferably about 44 to 45° F.) may run through coils of the fan coil units to cool and condense water vapor in the $CO_2$-enriched air before it enters the greenhouse. This provides a low temperature and humidity $CO_2$-enriched air entering the greenhouse. By way of example and not limitation, the entering $CO_2$-enriched air may be at about 60° F. and 30% relative humidity, even during hot humid summer days. Plants inside the greenhouse will aspirate water through leaves, which will evaporate, thereby cooling the plants to further off-set some of the solar gain. Depending upon the level of natural aspiration by plants inside the greenhouse, a misting system may be utilized to regulate temperature and humidity. Plants generally perform best with humidity levels between 50% and 70% but are not at serious risk unless the humidity approaches 100% and the temperature inside the greenhouse exceeds 95° F. for a sustained period.

The misting system employs sensor data, for both temperature and humidity, to control the temperature inside of the greenhouse through evaporative cooling to maintain the best possible growing temperature. The misting system may be used to reduce temperature until the relative humidity reaches about 90%. The misting system may also provide some irrigation. The greenhouse is also equipped with two retractable shading curtains. One shading curtain, which reduces the light by 30%, is deployed when the light intensity at the plant tips exceeds 400 micro mols/square meter/sec and the space temperature reaches more than 75° F. If the space temperature continues to rise and the light intensity remains above 400 micro mols/square meter/sec, the first shade curtain will be displaced by a second curtain that reduces the light by 60%. Optionally, both curtains may be deployed to provide enhanced shading.

The greenhouse may be equipped with a screened roof ventilation system. The screen prevents ingress by pests and particulate. Air and $CO_2$ in the greenhouse that has become hot and humid is continually displaced by fresh cooled dry $CO_2$ enriched air. The displaced hot humid gasses are expelled from the greenhouse through the vents. A positive pressure is maintained in the greenhouse to prevent airborne and gaseous contaminants and unconditioned ambient air from flowing through the vent.

If the temperature inside of the greenhouse continues to rise, the outside air fan and damper in the mixing and blending unit and the fan and coil units fans will be brought to maximum ventilation levels to increase the number of air displacements to the maximum design level for the system. This may result in reduced $CO_2$ concentrations but will reduce the risk of over-heating.

A system according to principles of the invention may recover fuel-generated water and water condensate from the outside air as a part of the overall water supply. This reduces the overall dependence on other available water sources, which may be limited or costly in many locations. Recovered water may be combined with a harvested rain water to minimize overall water requirements.

During the winter, the mixing and blending unit will bring in cool outside air which will be blended with the relatively hot exhaust gases leaving the direct contact heat exchanger. The exhaust gases will be entering the mixing and blending unit at approximately 130° F. and will serve to temper the colder outside air that will be entering through the filter system. The tempered air from the mixing and blending unit will be drawn to the fan and coil units where it will pass over the heating coils containing hot (e.g., 180° F.) water to maintain a nominal temperature inside the greenhouse of 75° F. As moisture will not have been removed from the gases/outside air by condensation, the plants along with the misting system will be enabled to maintain an average relative humidity in the greenhouse of about 70%.

The $CO_2$ level is maintained at 1,200 ppm during the winter by modulation of the intake outside air fans.

In addition to the fan and coil units, with their heating/cooling coils, the greenhouse may be provided with a heated pipe system in areas that are designed for vine type products. This system may circulate hot (e.g. 180° F.) water through pipes. Solenoid valves may control flow to the pipes. A heating control system (e.g., programmable logic controller with a thermostat and one or more temperatures sensors) may modulate water between the fan and coil system and the pipes to maintain an even distribution of the heat.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, steps, ornamental aspects, parameters or proportions as shown in the figures.

DETAILED DESCRIPTION

Figure 1:
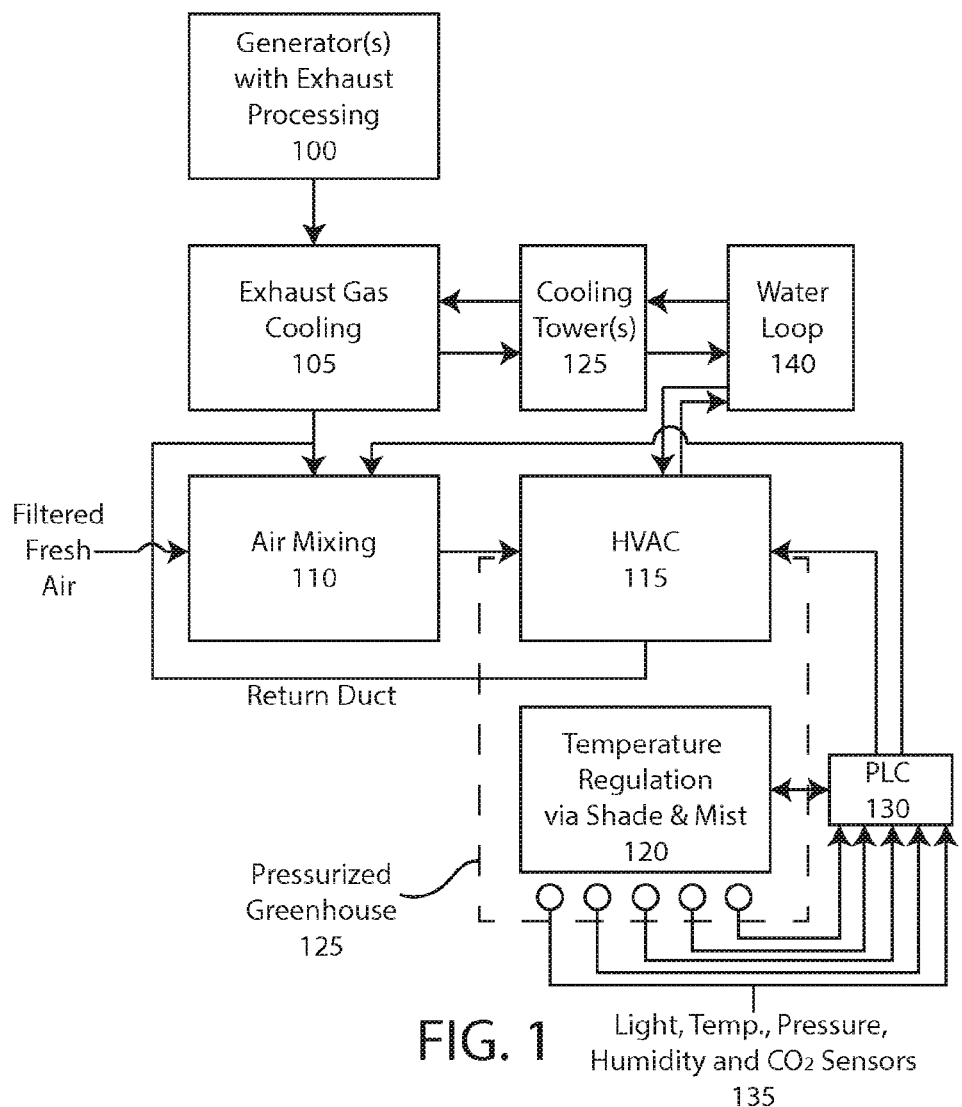
FIG. 1 is a high level block diagram showing subsystems for an exemplary greenhouse environment control system according to principles of the invention.
Figure 2:
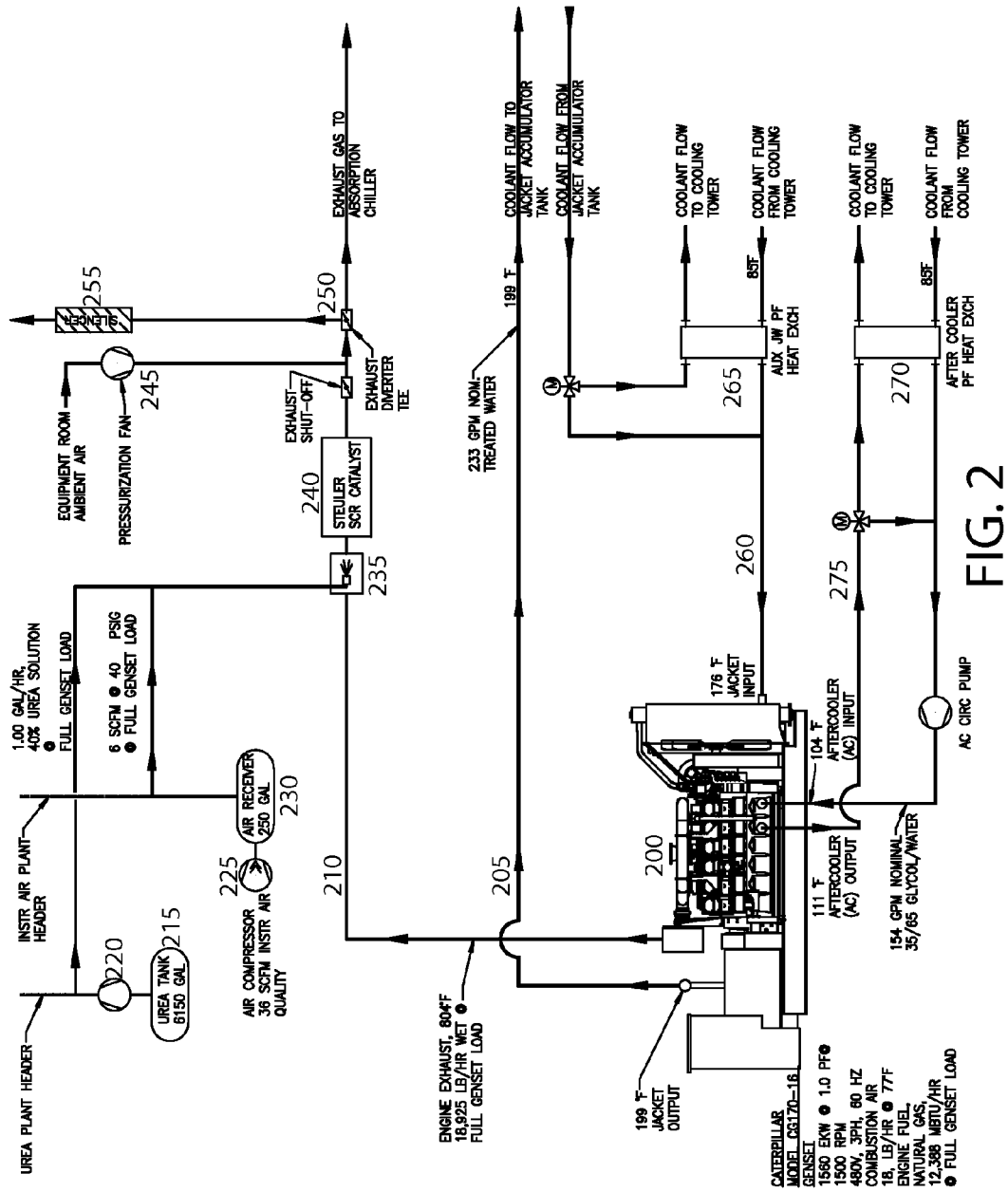
FIG. 2 is a high level schematic of a generator subsystem with exhaust gas processing for an exemplary greenhouse environment control system according to principles of the invention.
Figure 3:
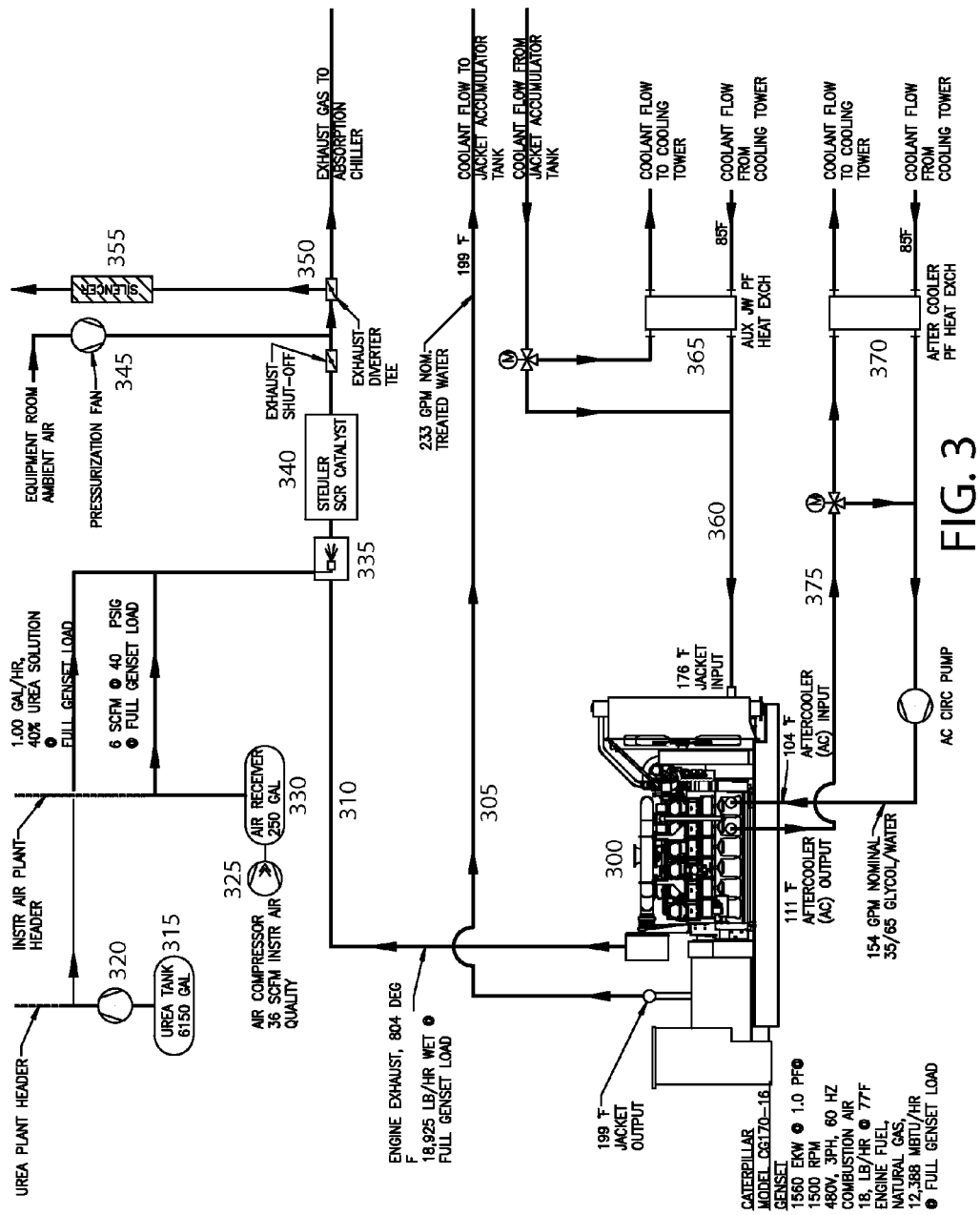
FIG. 3 is a high level schematic of a generator subsystem with exhaust gas processing for an exemplary greenhouse environment control system according to principles of the invention.

A climate control system for a greenhouse according to principles of the invention provides electricity, water, heating, cooling, dehumidification and $CO_2$ enriched air to the interior of a greenhouse for purposes of facilitating plant growth. With reference to the high level block diagram of FIG. 1, the system is comprised of a number of operably coupled subsystems that supply the aforementioned utilities and provide the functionality. The greenhouse 125 is substantially closed, excepting screened vents, and positively pressured to prevent intrusion by contaminants, pests and ambient air, it is not suitable for fan and pad evaporative cooling which requires an open path for rapid airflow to facilitate evaporative cooling. The subsystems include one or more generator subsystems 100 which simultaneously produce electricity for lighting and/or sale to a local grid, hot water for heating, and $CO_2$ for enhanced photosynthesis. Nox from the generator exhaust is removed by reaction with urea and catalytic reduction. Exemplary generator subsystems are illustrated in FIGS. 2 and 3 and discussed below.

Figure 4:
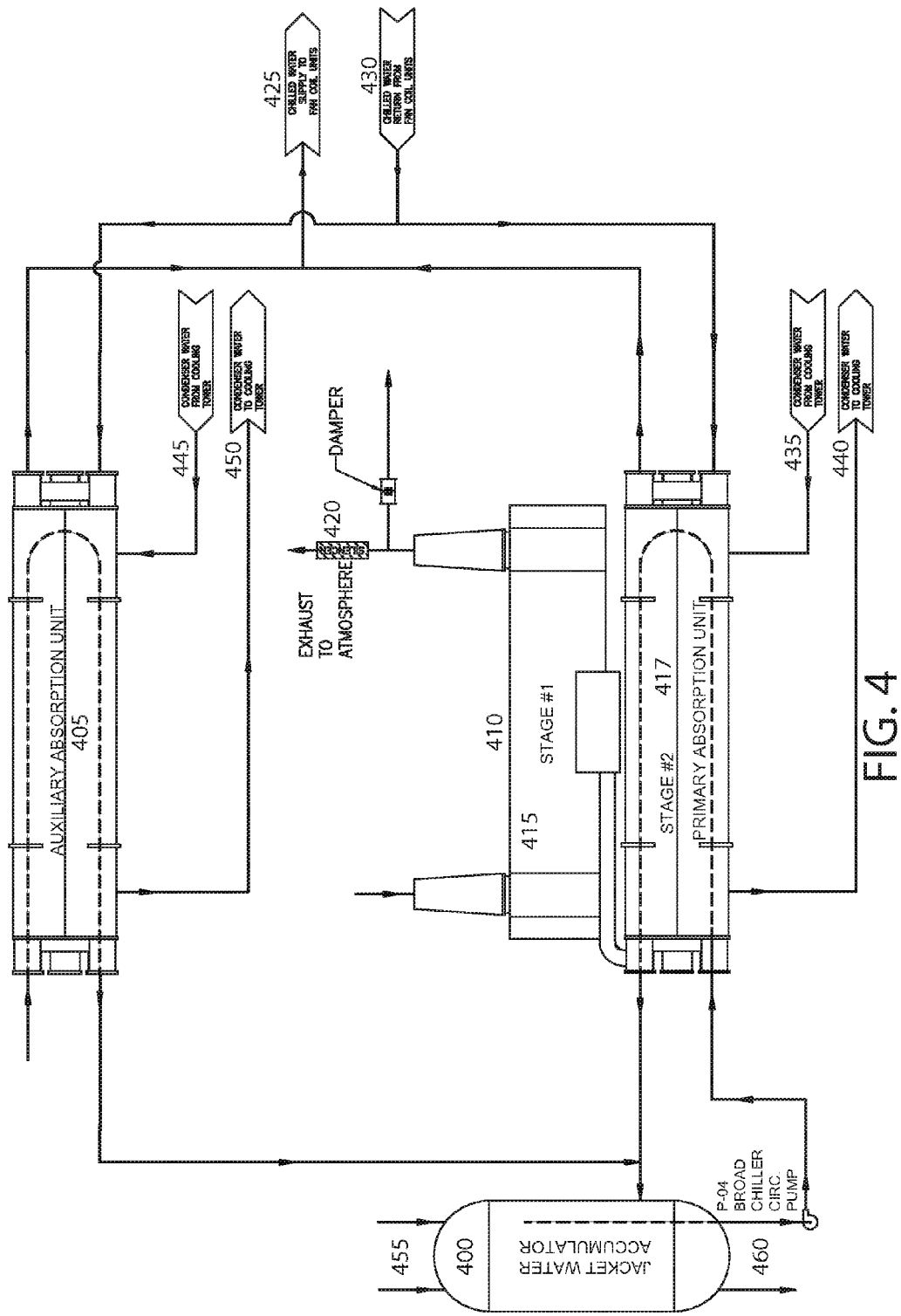
FIG. 4 is a high level schematic of a cooling subsystem for an exemplary greenhouse environment control system according to principles of the invention.

One or more exhaust gas cooling subsystems 105 substantially reduce the temperature of the hot exhaust gasses from the generator subsystems. In an exemplary embodiment, one or more single or multi-stage LiBr absorption units are employed. An exemplary exhaust gas cooling subsystem is illustrated in FIG. 4 and discussed below. Water from cooling towers 125 is supplied to the gas cooling subsystems 105.

Figure 5:
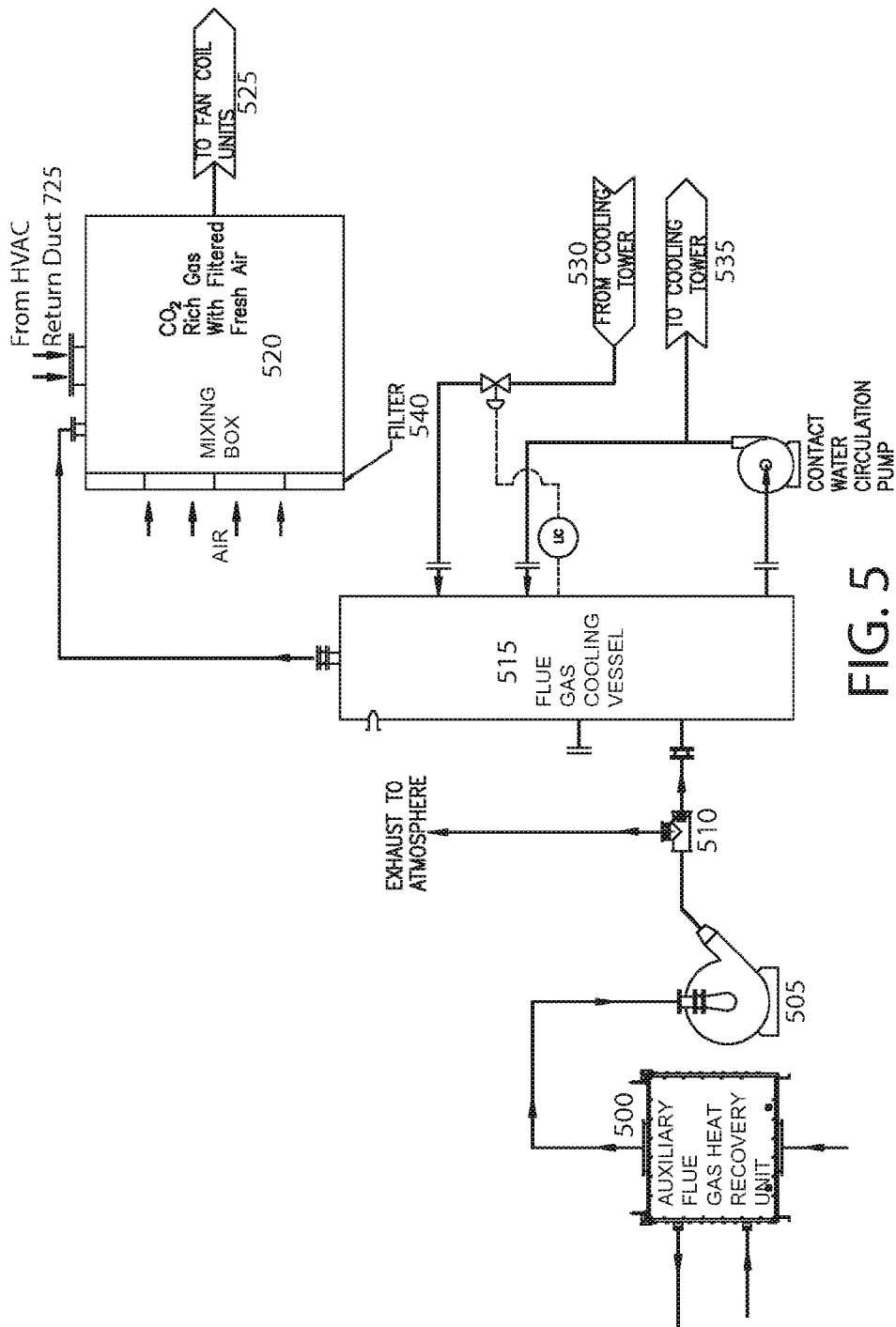
FIG. 5 is a high level schematic of a mixing subsystem for an exemplary greenhouse environment control system according to principles of the invention.

One or more air mixing subsystems 110 mix filtered fresh air from a fresh air duct and $CO_2$ from exhaust gas to meet a setpoint for the greenhouse that is conducive to both photosynthesis and human occupancy. A return duct within the greenhouse 125 may supply greenhouse air and $CO_2$ to the air mixing subsystems 110 for mixing with the fresh air and exhaust $CO_2$ to enhance efficiency. A programmable logic controller 130 may control fans and valves of the air mixing subsystem 110 to achieve a desired ratio of $CO_2$ to air in the greenhouse 125, as determined using one or more CO2 sensors 135 in the greenhouse 125. An exemplary air mixing subsystem is illustrated in FIG. 5 and discussed below.

Figure 6:
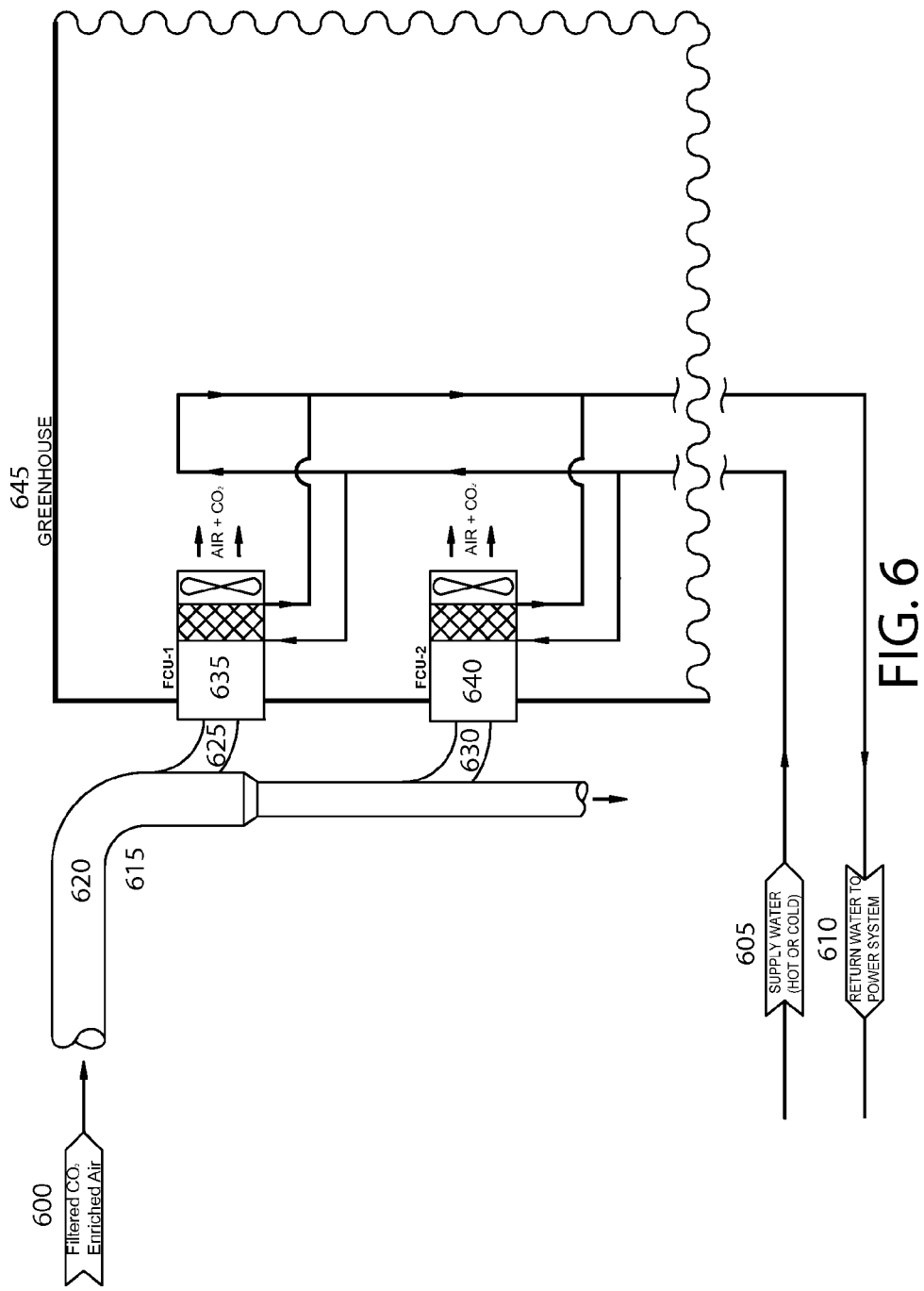
FIG. 6 is a high level schematic of an HVAC subsystem for an exemplary greenhouse environment control system according to principles of the invention.

One or more HVAC subsystems 115 feed hot or cold water to coils in fan coil units in a closed loop. Air and $CO_2$ from the mixing subsystem 110 pass over the coils to enter the greenhouse 125. The programmable logic controller 130 may control fans and valves in the fan coil units to control temperature of water supplied to the coils. Coil temperature may be controlled to achieve a temperature in the greenhouse 125 within a determined range of a setpoint value, as monitored via one or more temperature sensors 135 in the greenhouse 125. In this manner temperature and humidity of the greenhouse are controlled. An exemplary HVAC subsystem is illustrated in FIG. 6 and discussed below.

Figure 7:
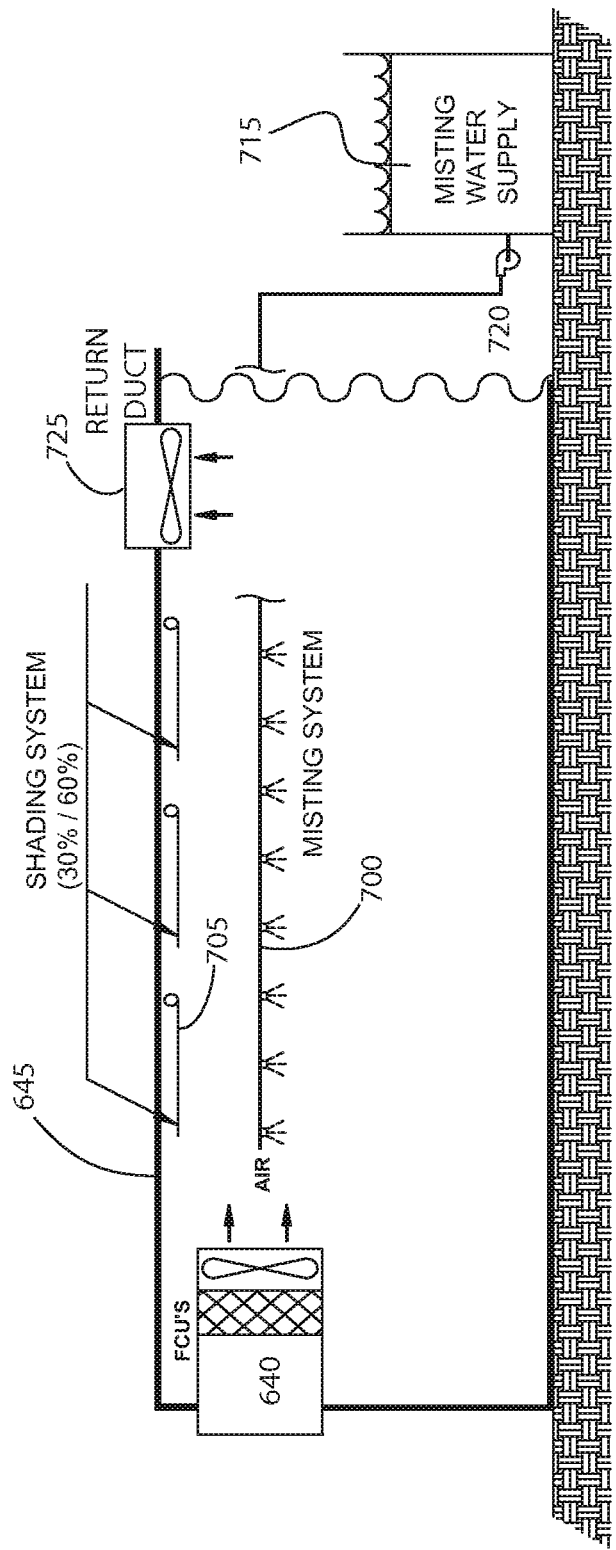
FIG. 7 is a high level schematic of a misting and shading subsystem for an exemplary greenhouse environment control system according to principles of the invention.
Figure 8:
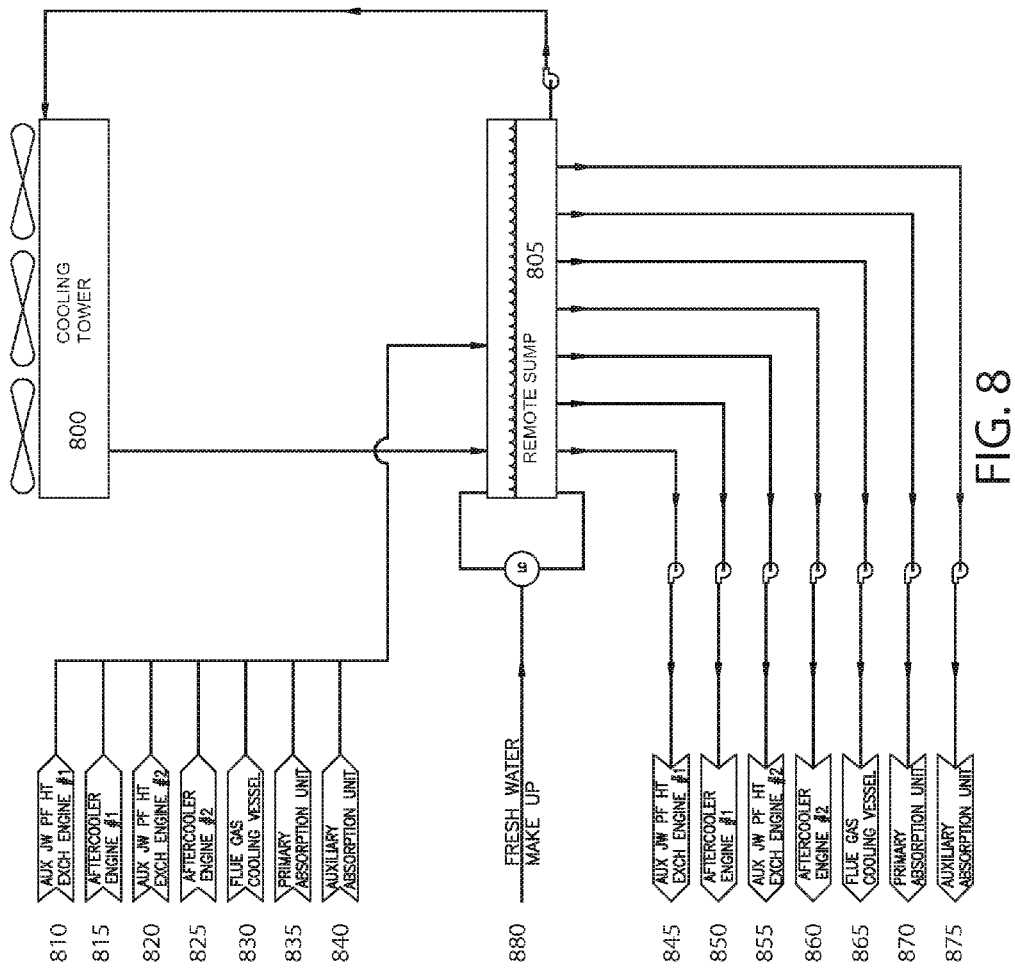
FIG. 8 is a high level schematic of a cooling tower subsystem for an exemplary greenhouse environment control system according to principles of the invention.

One or more temperature regulation subsystems 120 are provided for controlling shading and misting, which may be employed in addition to fan coil units. Shading is applied primarily to limit the temperature rise in the greenhouse. Misting is applied to provide an evaporative cooling effect. Retractable shading and misting may be controlled manually or by a programmable logic controller 130 based upon temperature and humidity sensor readings 135. An exemplary temperature regulation subsystem is illustrated in FIG. 7 and discussed below. A cooling tower subsystem 125 transfers heat from process water to the atmosphere via evaporative cooling. An exemplary cooling tower subsystem is illustrated in FIG. 8 and discussed below.

Figure 9:
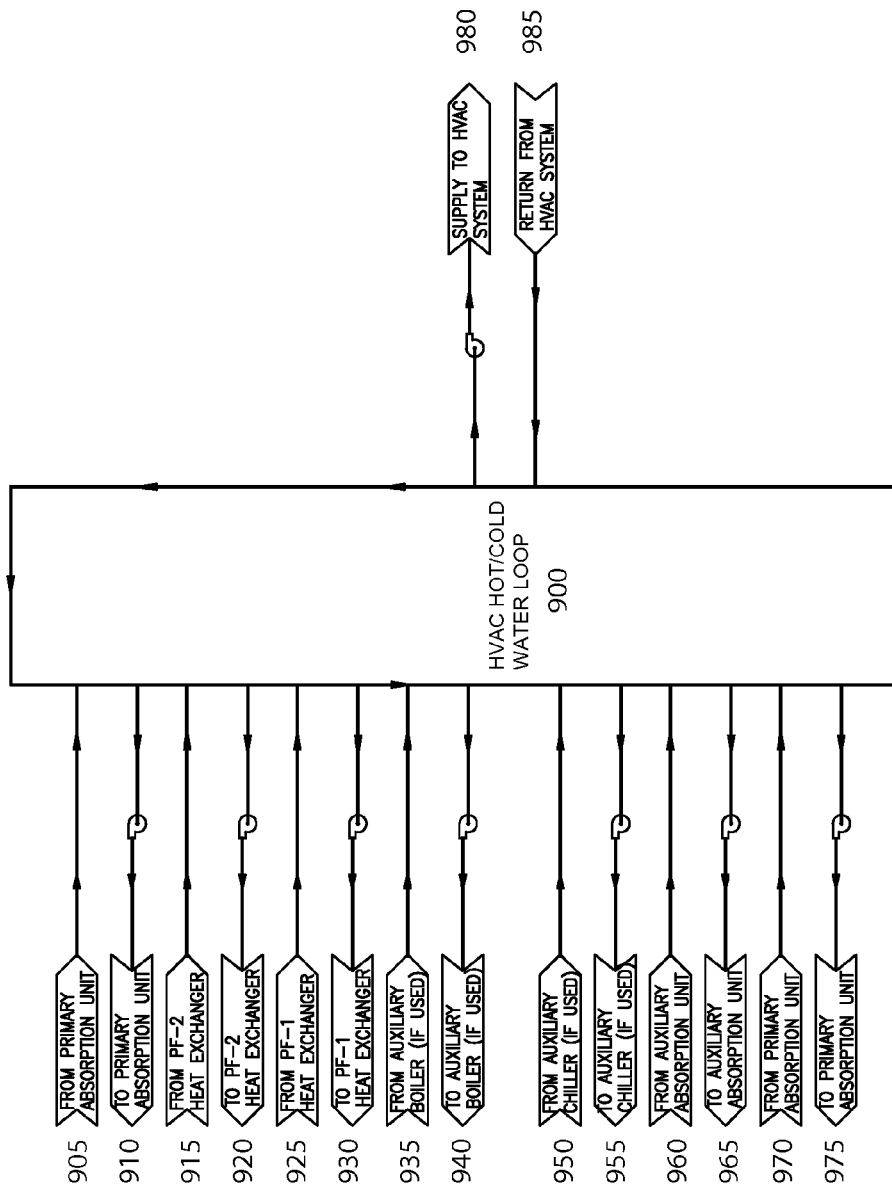
FIG. 9 is a high level schematic of a HVAC water loop for an exemplary greenhouse environment control system according to principles of the invention.

A closed water loop subsystem 140 provides water to fan coils units for heating or cooling. An exemplary closed water loop subsystem is illustrated in FIG. 9 and discussed below.

Together, the subsystems comprise an exemplary climate control system for a greenhouse according to principles of the invention. Natural gas generators produce exhaust which is treated via urea reaction and catalytic reduction to yield $CO_2$ and water. Absorption units cool the high temperature exhaust gasses to prevent excessive temperature increases in the greenhouse. A mixing unit mixes exhaust $CO_2$ with filtered fresh air. The filtered $CO_2$-enriched air enters the greenhouse at a controlled temperature conducive to plant growth and low humidity that substantially facilitates evaporative cooling via misting. Unfiltered ambient air and contaminants are substantially blocked from entry into the greenhouse.

Referring to FIG. 2, a schematic of a natural gas generator subsystem for use in a climate control system for a greenhouse according to principles of the invention is conceptually illustrated. A natural gas generator 200 simultaneously produces electricity for lighting and/or sale to a local grid, hot water for heating, and $CO_2$ for enhanced photosynthesis. In one non-limiting exemplary embodiment, the generator 200 comprises a Caterpillar CG170-16 generator set, which includes a 16 cylinder natural gas fueled internal combustion piston engine. Coolant (e.g., water) heated to approximately 200° F. flows from the generator through coolant outlet line 205 to a jacket accumulator tank. The flow rate for the exemplary generator 200 is approximately 200 to 250 gpm at full load. Exhaust from the generator 200 is heated to about 800° F. and communicated through exhaust outlet line 210 at a rate of about 18,500 to 19,000 lb/hr at full load.

Urea $CH_4N_2O$ and air are supplied to reduce NOx emissions in the exhaust from the generator 200. Urea $CH_4N_2O$ is supplied from a storage tank 215 by pump 220. An air compressor 225 supplies pressurized air to a tank 230 which supplies air to the exhaust. Optionally, the urea $CH_4N_2O$ may be diluted in water. Under heat, urea $CH_4N_2O$ decomposes to ammonia ($NH_3$) and carbon dioxide ($CO_2$). Ammonia ($NH_3$) reacts with NOx in the presence of a catalyst. Urea and air are supplied to the exhaust in a mixing tube 235 via an injector. Heat from the exhaust evaporates any water and decomposes the urea, releasing ammonia ($NH_3$) and carbon dioxide ($CO_2$). The ammonia ($NH_3$) uniformly mixes with the NOx contained in the exhaust in the mixing tube. The ammonia ($NH_3$) and NOx mixture in the exhaust stream enters a selective catalytic reduction (SCR) catalyst 240, such as a copper (or iron) zeolite catalyst. The SCR catalyst 240 causes a chemical reaction between the ammonia ($NH_3$) and NOx. The products are nitrogen ($N_2$) gas and water vapor ($H_2O$), from the reaction between the ammonia ($NH_3$) and NOx, and ($CO_2$) and air. The SCR catalyst may be provided in honeycomb, plate or corrugated geometries to provide ample surface area for catalytic reduction while reducing risk of plugging. Additional air may be introduced through fan 245. A diverter 250 allows some or all of the exhaust to be exhausted through a silencer 255. The silencer may comprise a muffler with baffles to attenuate the noise from exhaust. The undiverted exhaust gasses (i.e., $N_2$, $H_2O$, $CO_2$ and air) flow to an absorption chiller.

Coolant returns from the jacket accumulator to the generator 200 via a return line 260. The fluid may pass through one or more heat exchangers 265 on return to the generator 200.

An aftercooler associated with the generator 200 at the end of a supercharger or turbocharger chain reduces compressed air temperature to prevent premature ignition. Coolant from the aftercooler is circulated via fluid circuit 275 through a heat exchanger 270 to a cooling tower and back to the aftercooler.

A system according to principles of the invention is scalable. The principles of the invention are not limited to systems with one or two generators. Rather one or more generators may be utilized in systems within the scope of the invention. Additional generators may be provided to increase electric, heating, and $CO_2$ capacity. Larger generators with increased output may be used. For small scale greenhouses, smaller or fewer engines may be used. By way of example and not limitation, in the exemplary embodiment, two generators are shown.

Referring to FIG. 3, a second natural gas generator subsystem is conceptually illustrated. The second natural gas generator subsystem is substantially similar in structure, configuration and function to the first generator subsystem. Exhaust and coolant output from the second generator subsystem merges with output from the first generator subsystem to supply utilities to the greenhouse. More specifically, a second natural gas generator 300 simultaneously produces electricity for lighting and/or sale to a local grid, hot water for heating, and CO2 for enhanced photosynthesis. In one non-limiting exemplary embodiment, the generator 300 comprises a Caterpillar CG170-16 generator set. Coolant (e.g., water) heated to approximately 200° F. flows from the generator through coolant outlet line 305 to a jacket accumulator tank. The flow rate for the exemplary generator 300 is approximately 200 to 250 gpm at full load. Exhaust from the generator 300 is heated to about 800° F. and communicated through exhaust outlet line 310 at a rate of about 18,500 to 19,000 lb/hr at full load.

Urea $CH_4N_2O$ and air are supplied to reduce NOx emissions in the exhaust from the generator 300. Urea $CH_4N_2O$ is supplied from a storage tank 315 by pump 320. An air compressor 325 supplies pressurized air to a tank 330 which supplies air to the exhaust. Optionally, the urea $CH_4N_2O$ may be diluted in water. Under heat, urea $CH_4N_2O$ decomposes to ammonia ($NH_3$) and carbon dioxide ($CO_2$). Ammonia ($NH_3$) reacts with NOx in the presence of a catalyst. Urea and air are supplied to the exhaust in a mixing tube 335 via an injector. Heat from the exhaust evaporates any water and decomposes the urea, releasing ammonia ($NH_3$) and carbon dioxide ($CO_2$). The ammonia ($NH_3$) uniformly mixes with the NOx contained in the exhaust in the mixing tube. The ammonia ($NH_3$) and NOx mixture in the exhaust stream enters a selective catalytic reduction (SCR) catalyst 340, such as a copper zeolite catalyst. The SCR catalyst 340 causes a chemical reaction between the ammonia ($NH_3$) and NOx. The products are nitrogen ($N_2$) gas and water vapor ($H_2O$), from the reaction between the ammonia ($NH_3$) and NOx, and ($CO_2$) and air. Additional air may be introduced through fan 345. A diverter 350 allows some or all of the exhaust to be exhausted through a silencer 355. The silencer may comprise a muffler with baffles to attenuate the noise from exhaust. The undiverted exhaust gasses (i.e., $N_2$, $H_2O$, $CO_2$ and air) flow to an absorption chiller.

Coolant returns from the jacket accumulator to the generator 300 via a return line 360. The fluid may pass through one or more heat exchangers 365 on return to the generator 300.

An aftercooler associated with the generator 300 at the end of a supercharger or turbocharger chain reduces compressed air temperature to prevent premature ignition. Coolant from the aftercooler is circulated via fluid circuit 375 through a heat exchanger 370 to a cooling tower and back to the aftercooler.

Whether used for cooling or heating, high temperature exhaust gasses from the generator subsystems must be cooled before being introduced into the greenhouse. A cooling subsystem provides the desired cooling. In an exemplary implementation, the cooling devices of the cooling subsystem operate on available heat energy. The invention uses high temperature exhaust gasses to cool a fluid to a desired temperature. Temperature of exhaust gasses is then reduced to a desired temperature by heat transfer through one or more heat exchangers with coils filled with the chilled fluid. Substantial water vapor in the exhaust gasses condenses upon adequate cooling, resulting in a relative dry (low humidity) exhaust gas stream. The invention thus avoids reliance on conventional fan and pad or misting cooling systems to provide temperature control in the greenhouse, while also controlling humidity and providing a water supply. Conventional misting cooling systems may still be utilized in the greenhouse to provide additional cooling and irrigation. However, such a misting system is not a required component of a system according to principles of the invention. Thus, the invention provides cooling even in humid climates where evaporative cooling effects from fan and pad or misting cooling systems would be insufficient.

Referring now to FIG. 4, an exemplary cooling subsystem is conceptually illustrated. High temperature exhaust gasses from the generator subsystems described above with reference to FIGS. 2 and 3 are supplied to one or more absorption units of the cooling subsystem. Each absorption unit may be single or multiple stage. Single stage systems operate under two pressures—one corresponding to the condenser-generator (high pressure side) and the other corresponding to the evaporator-absorber. In multi-stage systems a series of condenser-generators operating at progressively reducing pressures are used. Heat is supplied to the highest stage generator operating at the highest pressure. The enthalpy of steam generated from this generator is used to heat and generate more refrigerant vapor in the lower stage generator and so on. In a cooling subsystem with more than one absorption unit, such as the subsystem illustrated in FIG. 4, conduit, manifolds and valves may be provided to selectively utilize one or more of the absorption units as may be needed to cool the hot exhaust gasses to a desired temperature.

With reference to FIG. 4, each absorption unit 405, 410 uses a heat source (e.g., heat from generator exhaust) to provide the energy needed to drive the cooling system. The auxiliary absorption unit is a single stage unit. The primary absorption unit 410 is a multi stage unit having first and second stages 415, 417. A liquid refrigerant evaporates in a low pressure environment, thus extracting heat from its surroundings. The gaseous refrigerant is then absorbed—dissolved into another liquid—reducing its partial pressure in the evaporator and allowing more liquid to evaporate. The refrigerant-laden liquid is then heated, causing the refrigerant to evaporate out. It is then condensed through a heat exchanger to replenish the supply of liquid refrigerant in the evaporator. In one exemplary embodiment, a solution of lithium bromide salt LiBr as the absorbent and water $H_2O$ as the refrigerant are used in the primary absorption unit 410. Water under low pressure is evaporated from coils that are being chilled. The evaporated water vapor is absorbed by a lithium bromide/water solution. Being extremely hygroscopic, lithium bromide readily absorbs the evaporated water vapor. The water is then driven off the lithium bromide solution using heat. Condensed water from the absorption units 405, 410 is supplied to one or more cooling towers 440, 450. Each absorption unit 405, 410 is cooled by condensed water from wet cooling towers 435, 444 to avoid the possibility of crystallization of the lithium bromide. Exhaust from an absorption unit 410 passes through a silencer 420 (e.g., a baffled muffler) to attenuate noise before release to the atmosphere.

Accumulator 400 is a pressure storage reservoir in which a non-compressible fluid (i.e., water) is held under pressure. The accumulator includes an inlet 455 and outlet 460. The accumulator 400 enables the cooling subsystem to cope with extremes of demand using a less powerful pump, to respond more quickly to a temporary demand, and to smooth out pulsations.

Chilled water from the cooling subsystem is supplied via outlet line 425 to heat exchangers, i.e., fan coil units, to further cool the exhaust gasses to a desired temperature before introduction into the greenhouse. As exhaust gasses pass through the heat exchangers, heat is transferred from the exhaust gasses to the supplied chilled water. The heated water is then recirculated back to the cooling subsystem via return line 430 where it is chilled again, as described above. This loop continues while the system operates.

Referring now to FIG. 5, an air mixing subsystem is conceptually illustrated. This subsystem adjusts a mix of fresh air and $CO_2$ from exhaust gas to meet a setpoint for the greenhouse. Output from this subsystem is $CO_2$ enriched air having a $CO_2$ concentration that maintains a greenhouse environment that is conducive to both photosynthesis and human occupancy.

Exhaust gasses are cooled and water condenses before the gasses are mixed with air. Cooling is achieved in primary 515 and auxiliary 500 cooling units. While two units 500, 515 are illustrated, the invention is not limited to any particular number of cooling units. One or more fans and/or pumps 505 propels the exhaust gasses through the air mixing subsystem.

An adjustable outlet vent 510 selectively diverts some of the exhaust gas to the atmosphere. The vent may be opened, closed or partially opened. The vent may be driven from 0% open (i.e., closed) to 100% open. When closed, none of the exhaust gas is diverted. When opened, all of the exhaust gas may be diverted. When partially opened, the portion of diverted gas depends upon the extent the vent is opened. Venting helps maintain a desired concentration of $CO_2$ in the gasses that are introduced into the greenhouse.

Excessive $CO_2$ is not desired for photosynthesis and poses a health risk to human occupants of the greenhouse. A $CO_2$ concentration setpoint may be from 750 to 2000 ppm, more preferably from 800 to 1500 ppm, and most preferably about 1200 ppm. Maintaining 1,200 ppm of $CO_2$ will increase the growth rate of most plants by as much as 40% compared to plants grown in greenhouses using only outside air. Such a $CO_2$-enriched greenhouse environment will be safe for human occupancy.

Concentration of $CO_2$ in the greenhouse may be monitored using $CO_2$ sensors. A programmable logic controller (PLC) may receive sensor input and adjust an actuator coupled to the vent 510 to control the state of the vent. The vent 510 may be continually or periodically adjusted in an effort to maintain a setpoint concentration of $CO_2$ in the greenhouse.

Each cooling unit in the air mixing subsystem 500, 515 may comprise a heat exchanger configured for efficient heat transfer from exhaust gasses to water. In a shell and tube heat exchanger, a set of tubes contains the hot exhaust gasses. Lower temperature water from an inlet 530 fluidly coupled to an outlet of a cooling tower runs over the tubes to absorb the heat required. The set of tubes may be plain or finned, e.g., longitudinally finned. As the exhaust gas is cooled below its water dew point, heat is transferred from the hot exhaust to the water, and water vapor in the exhaust gas condenses. The heated water may recirculate to a cooling tower via an outlet 535.

A mixing box 520 or plenum combines two fluid streams, the exhaust gas stream and a fresh air stream. The mixing box 520 may contain dampers or baffles to enhance mixing of the exhaust and air. The output 525 from the mixing box 520 is $CO_2$ enriched air. Air and $CO_2$ from one or more return ducts 725 within the greenhouse may be supplied into the mixing box 520 for combination with the fresh air and exhaust $CO_2$. The return duct 725 thus supplies previously conditioned air and $CO_2$ to reduce the cooling or heating demands of the system while improving efficiency and temperature stability in the greenhouse.

Fresh air is filtered before being mixed with exhaust gasses in the mixing box 520. Filtration removes contaminants and prevents intrusion by pests. In one nonlimiting example, fresh air is drawn through a particulate filter 540, such as a HEPA filter, by a fan or blower. The filter 540 may be placed at or upstream of the fresh air inlet to the mixing box 520. Air and Referring now to FIG. 6, an HVAC subsystem is conceptually illustrated. Hot or cold water is fed to coils in one or more fan coil units in a closed loop. Air and $CO_2$ passes over the coils to enter the greenhouse. In this manner temperature and humidity are controlled. All, or the vast majority, of the air and $CO_2$ in the greenhouse are supplied through the units of the HVAC subsystem, with the exception of emissions from plants, organic matter, personnel, and air entering through doors and any vents and gaps in the greenhouse structure. This configuration allows precise management of the internal environment of the greenhouse, including air quality, $CO_2$ concentration, temperature and humidity.

Filtered $CO_2$-enriched air from the mixing box 520 enters a manifold 620. The manifold 620 comprises a main pipe 620, or channel, from which, branch pipes or channels lead 625, 630. Each branch 635, 640 supplies the $CO_2$-enriched air to a fan coil unit 635, 640. Each fan coil unit is comprised of one or more coils for heating and cooling, a fan and a chamber. The coils receive hot or cold water from a central supply 605, and removes heat from or adds heat to the $CO_2$-enriched air through heat transfer. The $CO_2$-enriched air flows over the coils in the chamber. The fan coil units are supplied hot or cold water for heating or cooling from one or more central supplies such as the absorption units and cooling towers described herein, via an input line 605. A fan draws the $CO_2$-enriched air through the chamber and expels it into the greenhouse 645. The fan speed may be constant or variable. In the former case, a damper may be provided in each fan control unit to regulate flow. The fan and damper may be controlled by a programmable logic controller. In the latter case, fan speed may be controlled by a climate control system with a programmable logic controller. Each fan coil unit 635, 640 may contain an internal thermostat or may be wired to operate with a remote thermostat. Depending upon the selected chilled water temperatures and the relative humidity of the space, it is likely that the cooling coil will dehumidify the entering air stream, and as a by product of this process, it will at times produce a condensate which will may be carried to a drain. Each fan coil unit may contain a drip tray with drain connection for this purpose. The drain connection may lead to a water storage vessel for use in irrigation or use with the system described herein. Water flowing through the coils returns to the system described above via a return line 610, forming a closed loop.

The fans of the fan coil units 635, 640 maintain a positive pressure in the greenhouse. The positive pressure exceeds ambient air pressure. The greenhouse it is a substantially closed structure, excepting screened vents, which may be opened and closed. Air and $CO_2$ will be expelled from the greenhouse through any leak in the greenhouse, preventing ingress of unfiltered ambient air and contaminants. Thus, the greenhouse is a substantially closed positively pressurized structure containing $CO_2$-enriched air.

The fan coil units may be sized and configured to provide a determined amount of air changes per time period. In an exemplary embodiment, the fan coil units change the greenhouse air about once per twenty minutes, or three times per hour. To achieve the requisite volumetric flow for the determined number of changes, the number and size of the fan coil units will depend upon the size of the greenhouse as well as the volumetric flow rate of each fan coil unit. Referring now to FIG. 7, a temperature regulation subsystem is conceptually illustrated. Shading and misting are employed, in addition to fan coil units 635, 640. Shading is applied primarily to limit the temperature rise in the greenhouse (i.e., limit solar gain). Misting is applied to provide an evaporative cooling effect.

The amount of energy that comes from the sun is high from late spring until early autumn. This energy increases air and plant temperature. The quality of some crops decline when temperature is excessively high. In addition, photosynthesis peaks for many high light greenhouse crops at about half the intensity of full sunlight. Plants require light intensities between 200 micro mols/square meter/sec and 600 micro mols/square meter/sec. Plants have a maximum number of mols of light that they can effectively utilize each growing period. Therefore, the extra light simply is not needed and potentially detrimental. Even for many high-light crops, the shading percentage should be about 40 percent, and perhaps slightly higher (50 percent) for transparent greenhouses from late spring until early autumn. When light becomes limited once again in the autumn, shading may be reduced so that crop quality is not marginalized.

In an exemplary embodiment, retractable shade curtains 705 are installed inside the greenhouse above the crop. In a particular preferred embodiment the shading system includes both 30% and 60% light reducing shade curtains. Individually and in combination the retractable curtains enable several grades of shading (0%, 30%, 60% and 90%) that are suitable for a wide range of plants at all times of year. The fan coil units are below the shade curtains. Solar energy is allowed to enter the greenhouse before it is reflected by the curtains 705. This allows heat to accumulate above the shading material, which provides additional insulation during cooler evening hours. The shade curtains may be deployed in the evenings to maintain the heated air space above the shading material during evening hours. The ability to selectively retract shade curtains 705 during periods of low light is an important attribute of the shading device. Deployment and refraction of the shade curtains is controlled by a programmable logic controller.

As discussed above, a system according to principles of the invention removes water vapor as condensate from the air and $CO_2$ mixture that is blown in through the fan coil units 635, 640. Thus, the $CO_2$-enriched air blown into the greenhouse is relatively dry and conducive to evaporative cooling, even when the greenhouse is located in a region with high ambient humidity.

It is recognized that the plants can endure temperatures and humidity levels above this point, and that the greenhouse may reach conditions that are above the ideal levels. Additional misting may be employed as the temperatures rise to keep from harming the plants.

A fogging or misting system 700 generates a fog or fine mist to help cool the interior of the greenhouse and provide irrigation, as solar gain increases. A pump 720 supplies water, from a storage vessel 715, to nozzles of the misting system 700. The storage vessel 715 may receive water from any available source of clean water, including, but not limited to, captured condensate from the system. The nozzle emit a mist of water droplets. The water droplets are small enough so they do not saturate the plants, to avoid the development of diseases and limit deposit of salts contained in the water, when the water evaporates from the surface of the leaves between fogging or misting episodes. The droplets are emitted at a height above the fan coil units and above the plant canopy, so that evaporation may commence before reaching the plants, absorbing energy and decreasing the air temperature. The current of air and $CO_2$ from the fan coil units 635, 640 facilitates such evaporation. Plants aspirate water and will work in conjunction with the misting system to maintain an average relative humidity of between about 50% and 70%, and an ideal temperature of between about 55° F. to 85° F., preferably about 75° F.

One or more return ducts 725 direct air and $CO_2$ from the greenhouse to the mixing box 520, where it can be combined with fresh air and exhaust $CO_2$. The return duct 725 thus supplies previously conditioned air and $CO_2$ to reduce the cooling or heating demands of the system while improving efficiency and temperature stability in the greenhouse.

Such evaporative cooling via misting would not be efficient or even effective in humid environments without the greenhouse being substantially closed and supplied with relatively dry air. In such environments, where fan and pad cooling systems have been used, the cooling achieved is predominantly from drenching in water rather than evaporation. Such drenching can be detrimental to plant health. Additionally, the openness of a fan and pad cooling system allows ambient air, contaminants and pests to infiltrate the system.

Referring now to FIG. 8, a cooling tower subsystem for use in a climate control system for a greenhouse according to principles of the invention is conceptually illustrated. The cooling tower subsystem includes a cooling tower 800 and a sump 405. The cooling tower is a heat removal device used to remove the heat absorbed in the circulating cooling water system by transferring the heat to the atmosphere. In an exemplary embodiment, the cooling tower uses the evaporation of water to remove the absorbed heat and cool the working fluid to near the wet-bulb air temperature. However, other cooling towers such as closed circuit dry cooling towers may be utilized. In a particular embodiment, the cooling tower may comprise a mechanical draft tower using either single or multiple fans to provide flow of a known volume of air through the tower to achieve stability and reduce the affect of psychrometric variables. The fans also provide a means of regulating air flow, to compensate for changing atmospheric and load conditions, by fan capacity manipulation and/or cycling. A collection basin is a vessel below and integral with the tower 800 where water is transiently collected and directed to the sump 805. The sump 805 is a depressed chamber either below or alongside (but contiguous to) the collection basin of the cooling tower 800. Water from the basin 800 flows into the sump 805.

Hot fluid from the engines and their water-cooled accessories, flue gas cooling vessel and primary and auxiliary absorption units 810-840 enter the sump 805, where it mixes with cooled water from the cooling tower 800. Collected fluid from the sump is pumped into the cooling tower 800, where it is cooled and returns to the sump 805. Cooled water from the sump 805 is returned to the engines and their water-cooled accessories, flue gas cooling vessel and primary and auxiliary absorption units 845-875. A fresh water makeup supplies fresh water to the sump 805 to replenish water lost due to evaporation. The fresh water may be supplied from any fresh water source including harvested rainwater, water collected from engine exhaust gasses, wells and utility supplied water.

Referring now to FIG. 9, a closed water loop 900 provides condenser water to coils of interior zone HVAC units for heating or cooling. The water loop 900 temperature may be maintained and regulated from about 60° F. to 100° F. and more preferably from about 65° F. to 95° F. to provide adequate heating and cooling year round in all climates. Water flows to and from the absorption units, heat exchangers, one or more optional boilers, and chillers, via inlet and outlet lines 905-975 to supply the warm or cool water desired from achieving a targeted greenhouse indoor temperature. Supplied water flows to the units of the HVAC system via supply line 980. Return from the HVAC system is received via return line 985.

Figure 10:
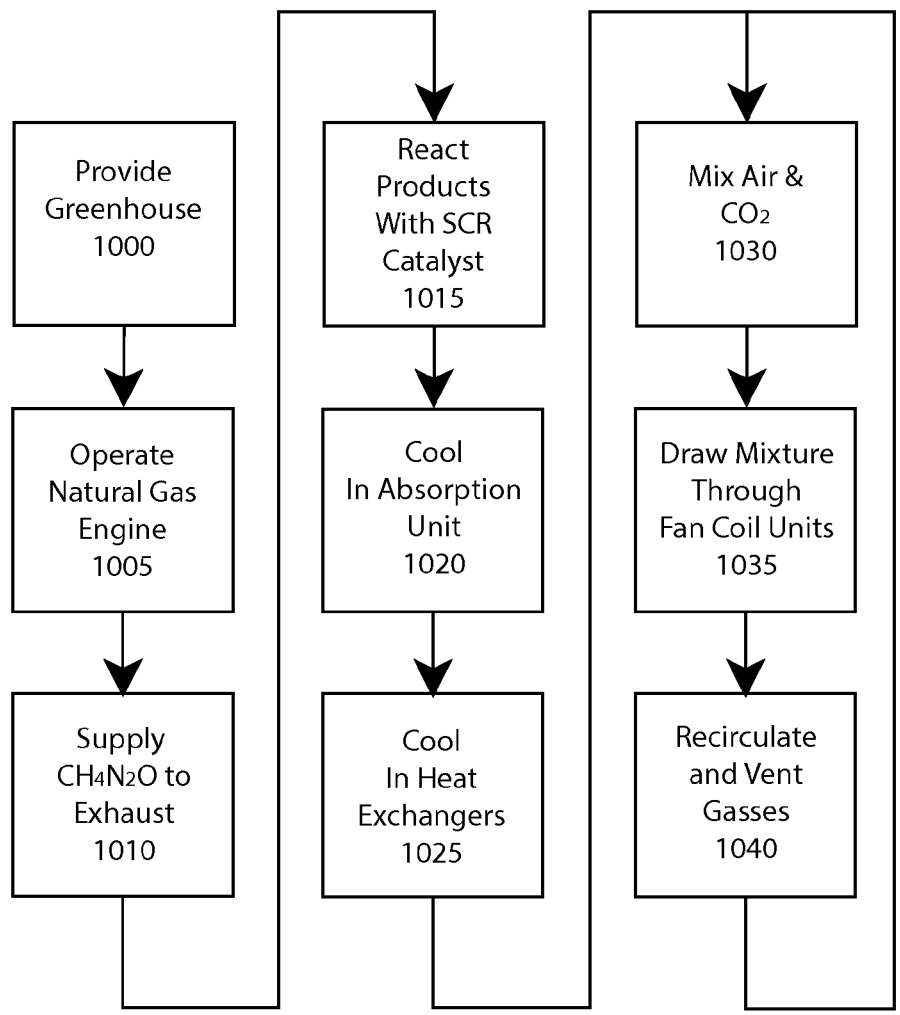
FIG. 10 is a high level flow chart for an exemplary greenhouse environment control methodology according to principles of the invention.

With reference to the flowchart of FIG. 10, an exemplary method of controlling climate for a greenhouse according to principles of the invention entails providing a greenhouse that receives substantially all air and $CO_2$ through a plurality of fan coil units, as in step 1000. Unlike conventional greenhouses which maintain a stream of air from an inlet to an opposite outlet for fan and pad cooling, a greenhouse according to principles of the invention is substantially closed. Air and $CO_2$ are introduced through fan coil units. Also, unlike a conventional greenhouse, a greenhouse according to principles of the invention receives dehumidified air and $CO_2$ within a setpoint temperature range through the fan coil units. This obviates fan and pad cooling. It also allows greater control over the gasses and contaminants that enter the greenhouse. It also enables use of the greenhouse in humid environments, where conventional evaporative cooling methods would be inadequate.

In the vicinity of the greenhouse, but external to the greenhouse, a natural gas fueled internal combustion engine is operated to produce high temperature exhaust, as in step 1005. Urea $CH_4N_2O$ and air are supplied to the hot exhaust to reduce NOx emissions, as in step 1010. Under heat, urea $CH_4N_2O$ decomposes to ammonia ($NH_3$) and carbon dioxide ($CO_2$). Ammonia ($NH_3$) reacts with NOx in the presence of a catalyst. Urea and air are supplied to the exhaust in a mixing tube via an injector. Heat from the exhaust evaporates any water and decomposes the urea, releasing ammonia ($NH_3$) and carbon dioxide ($CO_2$). The ammonia ($NH_3$) uniformly mixes with the NOx contained in the exhaust in the mixing tube. The ammonia ($NH_3$) and NOx mixture in the exhaust stream enters a selective catalytic reduction (SCR) catalyst, such as a copper zeolite catalyst, as in step 1015. The SCR catalyst causes a chemical reaction between the ammonia ($NH_3$) and NOx. The products are nitrogen ($N_2$) gas and water vapor ($H_2O$), from the reaction between the ammonia ($NH_3$) and NOx, and ($CO_2$) and air. These products are supplied to an absorption chiller for cooling, as in step 1020.

Temperature of the exhaust products is reduced by passing the exhaust gasses through one or more absorption units, as in step 1020, where heat from the exhaust causes a liquid refrigerant to evaporate in a low pressure environment. The gaseous refrigerant is then absorbed—dissolved into another liquid—reducing its partial pressure in the evaporator and allowing more liquid to evaporate. The refrigerant-laden liquid is then heated, causing the refrigerant to evaporate out. It is then condensed through a heat exchanger to replenish the supply of liquid refrigerant in the evaporator. In one exemplary embodiment, a solution of lithium bromide salt LiBr as the absorbent and water $H_2O$ as the refrigerant are used in an absorption unit. Water under low pressure is evaporated from coils that are being chilled. The evaporated water vapor is absorbed by a lithium bromide/water solution. Being extremely hygroscopic, lithium bromide readily absorbs the evaporated water vapor. The water is then driven off the lithium bromide solution using heat. Condensed water from the absorption units is supplied to one or more cooling towers. Each absorption unit is cooled by condensed water from the cooling towers to avoid the possibility of crystallization of the lithium bromide.

One or more heat exchangers may be used to further reduce the temperature of the exhaust products, as in step 1025. Cooled water from the cooling towers may be supplied to the heat exchangers. Heat from the exhaust gas is transferred to the cooled water from the cooling tower.

Filtered fresh air and $CO_2$ from the cooled exhaust gas from the absorption unit are mixed with air and $CO_2$ drawn through a return duct from inside the greenhouse to produce $CO_2$ enriched air having a $CO_2$ concentration that maintains a greenhouse environment that is conducive to both photosynthesis and human occupancy, with a $CO_2$ concentration setpoint from 750 to 2000 ppm, more preferably from about 800 to 1500 ppm, as in step 1030. The $CO_2$ concentration is measured inside the greenhouse at one or more locations using $CO_2$ sensors. Using a programmable logic controller, the mixture of air and $CO_2$ may be adjusted to achieve and maintain the $CO_2$ concentration within a determined range of the setpoint.

The fresh air and $CO_2$ mixture are passed over the coils of the fan coil units leading into the greenhouse, as in step 1035. In this manner temperature and humidity are controlled. All, or the vast majority, of the air and $CO_2$ in the greenhouse are supplied through the fan coil units. This configuration allows precise management of the internal environment of the greenhouse, including air quality, $CO_2$ concentration, temperature and humidity. The coils receive hot or cold water from a supply source, and remove heat from or adds heat to the $CO_2$-enriched air through heat transfer. Depending upon the water temperature and the relative humidity of the $CO_2$-enriched air, the coils may dehumidify the entering stream, and as a by product of this step produce a condensate. The fresh air and $CO_2$ mixture that has passed over the coils is at a temperature suitable for plant growth and human occupancy when it enters the greenhouse. Air and $CO_2$ in the greenhouse are drawn through a return duct, as in step 1040, and then mixed with filtered fresh air and $CO_2$ from the cooled exhaust gas from the absorption unit as in step 1030.

Figure 11:
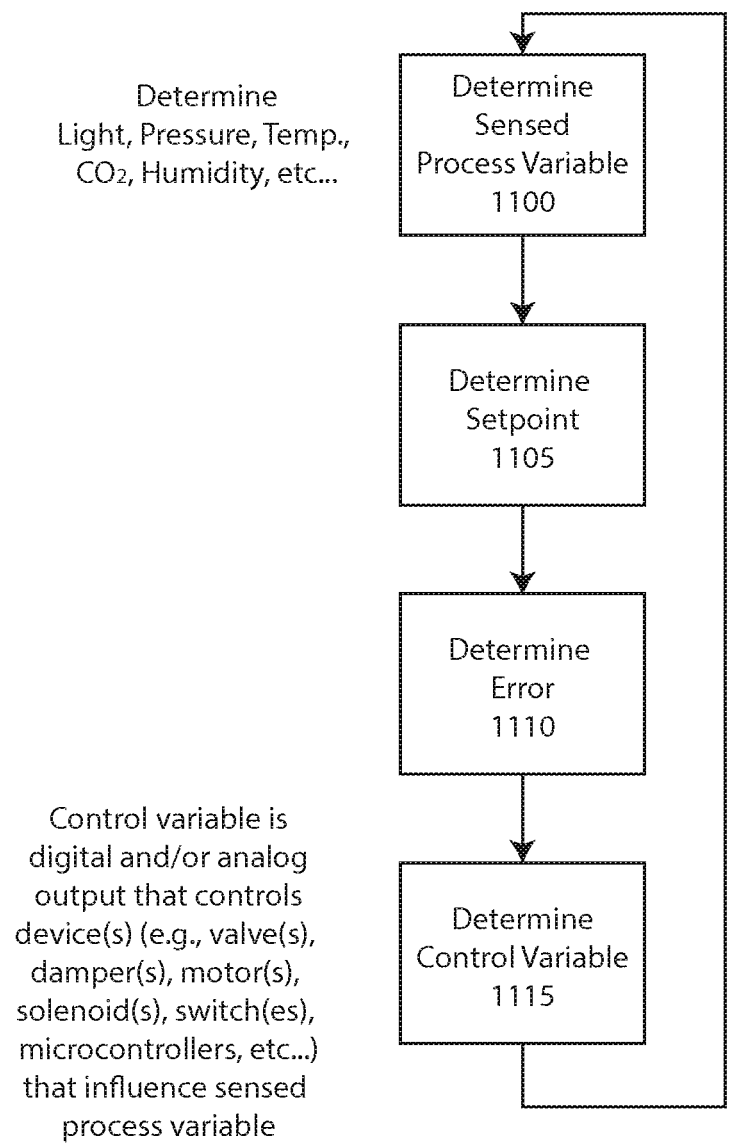
FIG. 11 is a high level flow chart for a programmable logic control methodology according to principles of the invention.

Referring now to FIG. 11, a programmable logic controller, such as but not limited to a proportional-integral-derivative controller (PID controller), calculates an "error" value 1110 as the difference between a measured process variable (e.g., temperature, pressure, light, humidity, CO2 concentration, etc. . . . ) 1100 and a desired setpoint 1105. The process variable 1100 is determined from sensor input for the measured variable. The controller attempts to minimize the error by adjusting the process control variables 1115 which are analog and/or digital logic level signals output to controlled devices. By way of example and not limitation, controlled devices may include valves, dampers, motors, solenoids, actuators, switches, microcontrollers, etc. . . . Adjustment of the controlled devices via the control variables 1115 influence the sensed process variables. For example, a damper may be opened or closed fully or partially and/or fan's speed may be increased or decreased to adjust CO2 concentration, or pressure or temperature. As another non-limiting example, a shade may be deployed or retracted to adjust light intensity. As yet another example, misting may cease to limit humidity or commence to reduce temperature. In the interest of achieving a gradual convergence to the desired setpoints, the controller may damp oscillations by tempering its adjustments, or reducing the loop gain, thereby avoiding or minimizing overshoot.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A greenhouse environment control system comprising
a greenhouse for growing plants, said greenhouse comprising a substantially enclosed structure comprised of a transmissive material that allows passage of sunlight, said substantially enclosed structure defining an interior in which plants may be grown;
said environment control system comprising a plurality of subsystems, said plurality of subsystems including a generator subsystem, a gas cooling subsystem, a mixing subsystem, and an HVAC subsystem;
said generator subsystem comprising a natural gas fueled engine producing a stream of exhaust gases and an exhaust gas treatment module converting the stream of exhaust gases to a gas stream comprised of nitrogen gas, water vapor and carbon dioxide;
said gas cooling subsystem being in fluid communication with the generator subsystem and comprising a plurality of fluidly coupled heat transfer units, said plurality of fluidly coupled heat transfer units reducing the temperature of the gas stream to about 200° F. to 100° F.;
said mixing subsystem comprising an inlet fluidly coupled to the gas cooling system, an outlet, a fresh air duct through which fresh air flows, a particle filter associated with the fresh air duct, the fresh air flowing through the fresh air duct being filtered by passing through the particle filter, a mixing chamber in which the gas stream is mixed with filtered fresh air to produce $CO_2$-enriched air, said $CO_2$ enriched air having a concentration of $CO_2$ from about 800 ppm to 2000 ppm, said $CO_2$ enriched air flowing out of the outlet;
said HVAC subsystem comprising a plurality of fan coil units, each fan coil unit including a housing defining an interior compartment, a gas inlet being fluidly coupled to the outlet of the mixing subsystem and leading to the interior compartment, a gas outlet leading from the interior compartment, a coil contained in the interior compartment, said coil having an inlet and an outlet, and a fluid flowing through said coil, said fluid being at a temperature effective for cooling the $CO_2$ enriched air, and said interior compartment defining a flow path from the gas inlet of the fan coil unit, over the coil, and out of the gas outlet, said gas outlet being in fluid communication with the interior of the greenhouse.

2. A greenhouse environment control system according to claim 1, said generator subsystem including a urea supply in fluid communication with the stream of exhaust gases and a nozzle introducing urea from the urea supply into the stream of exhaust gas.

3. A greenhouse environment control system according to claim 2, said generator subsystem further including a selective catalytic reduction catalyst downstream of the nozzle introducing urea from the urea supply into the stream of exhaust gas, the selective catalytic reduction catalyst comprising a metal zeolite catalyst effective for reduction of NOx.

4. A greenhouse environment control system according to claim 3, said metal zeolite catalyst comprising a catalyst from the group consisting of an iron zeolite and a copper zeolite.

5. A greenhouse environment control system according to claim 1, said gas cooling subsystem comprising an absorption chiller, said absorption chiller including a condenser-generator, an evaporator-absorber containing a desiccant, and a refrigerant comprised of water, said condenser generator being fluidly coupled to the generator subsystem and receiving the gas stream comprised of nitrogen gas, water vapor and carbon dioxide from the generator subsystem at an inlet temperature, said gas stream transferring heat to evaporate the refrigerant from the desiccant, the desiccant being chemically stable at the inlet temperature, and said transferred heat reducing the temperature of the gas stream.

6. A greenhouse environment control system according to claim 5, said desiccant comprising lithium bromide salt (LiBr).

7. A greenhouse environment control system according to claim 6, said absorption chiller including a first stage and a second stage, said first stage containing refrigerant and said second stage containing evaporated refrigerant from the first stage absorbed by the desiccant.

8. A greenhouse environment control system according to claim 5, said gas cooling subsystem further comprising a heat exchanger downstream of and fluidly coupled to the absorption chiller, said heat exchanger comprising a gas flow chamber with an inlet and an outlet, and a coil through which a water refrigerant flows, said gas stream from the absorption chiller flowing through the gas flow chamber from the inlet of the gas flow chamber over the coil of the gas flow chamber to the outlet of the gas flow chamber, and said gas stream transferring heat to the water refrigerant in the coil of the gas flow chamber.

9. A greenhouse environment control system according to claim 1, said mixing subsystem comprising a mixing receptacle with a first inlet and a second inlet for combining two fluid streams in the mixing receptacle including a first fluid stream comprised of the gas stream from the gas cooling subsystem at a first volumetric flow rate and a second fluid stream comprised of fresh air at a second volumetric flow rate, and an outlet, the combined fluid streams being expelled through the outlet.

10. A greenhouse environment control system according to claim 9, said mixing subsystem further comprising an adjustable damper in the mixing receptacle, said adjustable damper regulating the second volumetric flow rate of fresh air comprising the second fluid stream supplied to through the second inlet of the mixing receptacle to the mixing receptacle thereby regulating a ratio of the first fluid stream to the second fluid stream.

11. A greenhouse environment control system according to claim 10, said first fluid stream containing $CO_2$ and said regulating a ratio of the first fluid stream to the second fluid stream includes regulating concentration of $CO_2$ in the combined fluid streams.

12. A greenhouse environment control system according to claim 11, further comprising a particulate filter associated with the second inlet, said particulate filter being upstream of the mixing receptacle and filtering all of the second fluid stream flowing through the second inlet into the mixing receptacle.

13. A greenhouse environment control system according to claim 4-9, said HVAC subsystem comprising a manifold fluidly coupling the outlet of the mixing receptacle to the gas inlet of each of the plurality of fan coil units.

14. A greenhouse environment control system according to claim 1,
said fan coil units of the HVAC subsystem being at a determined height, and said greenhouse environment control system further comprising:
a plurality of retractable shade curtains disposed in the interior of the greenhouse adjacent to the transmissive material that allows passage of sunlight at a height above the determined height of the fan coil units.

15. A greenhouse environment control system according to claim 14, each of said plurality of retractable shade curtains including a first retractable shade and a second retractable shade, the first retractable shade and second retractable shade providing different amounts of shading, about 30% shading for the first shade and about 60% shading for the second shade.

16. A greenhouse environment control system according to claim 1, said fan coil units of the HVAC subsystem being at a determined height, and said greenhouse environment control system further comprising:
a misting system including a plurality of misting nozzles in the interior of the greenhouse at a height above the determined height of the fan coil units, each of the misting nozzles emitting a water mist.

17. A greenhouse environment control system according to claim 1, said greenhouse including a vent and a vent screen, an exterior environment surrounding the greenhouse, said vent providing a fluid flow path from the interior space of the greenhouse to the exterior environment, and said vent screen being disposed in the fluid flow path.

18. A greenhouse environment control method comprising steps of:
running a natural gas fueled engine to produce a stream of exhaust gases;
converting the stream of exhaust gases to a gas stream comprised of nitrogen gas, water vapor and carbon dioxide;
reducing the temperature of the gas stream to about 200° F. to 100° F. using a cooling subsystem including an absorption chiller;
mixing the gas stream with filtered fresh air to produce $CO_2$-enriched air, said $CO_2$ enriched air having a concentration of $CO_2$ from about 800 ppm to 2000 ppm;
supplying the $CO_2$-enriched air to a plurality of fan coil units;
modulating the temperature of the $CO_2$-enriched air using the fan coil units;
supplying the temperature modulated $CO_2$-enriched air from the fan coil units to the greenhouse at a pressure greater than ambient pressure, said supplied temperature modulated $CO_2$-enriched air positively pressurizing the greenhouse.

19. The greenhouse environment control method of claim 18, wherein said step of converting the stream of exhaust gases to a gas stream comprised of nitrogen gas, water vapor and carbon dioxide comprises supplying urea through a nozzle to the stream of exhaust gases and providing a selective catalytic reduction catalyst downstream of the nozzle, the selective catalytic reduction catalyst comprising a metal zeolite catalyst effective for reduction of NOx.

20. The greenhouse environment control method of claim 18, further comprising a step of cooling the $CO_2$-enriched air supplied to the plurality of fan coil units to remove water vapor via condensation before supplying the temperature modulated $CO_2$-enriched air from the fan coil units to the greenhouse.

* * * * *